(12) United States Patent
Cederström (10) Patent No.: US 12,486,067 B2
(45) Date of Patent: Dec. 2, 2025

(54) METHOD FOR PACKAGING A FOOD PRODUCT AND A PACKAGING MACHINE

(71) Applicant: Tetra Laval Holdings & Finance S.A., Pully (CH)

(72) Inventor: Daniel Cederström, Limhamn (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 18/855,801

(22) PCT Filed: Apr. 13, 2023

(86) PCT No.: PCT/EP2023/059617
§ 371 (c)(1),
(2) Date: Oct. 10, 2024

(87) PCT Pub. No.: WO2023/202938
PCT Pub. Date: Oct. 26, 2023

(65) Prior Publication Data
US 2025/0171188 A1    May 29, 2025

(30) Foreign Application Priority Data
Apr. 21, 2022  (EP) .................................... 22169207

(51) Int. Cl.
*B65B 61/02* (2006.01)
*A61L 2/08* (2006.01)
(Continued)

(52) U.S. Cl.
CPC ............ *B65B 61/025* (2013.01); *A61L 2/087* (2013.01); *A61L 2/10* (2013.01); *B41J 11/00214* (2021.01);
(Continued)

(58) Field of Classification Search
CPC ......... B65B 61/025; B65B 9/20; B65B 55/08; A41J 11/00214; A61L 2/087; A61L 2/10;
(Continued)

(56) References Cited

U.S. PATENT DOCUMENTS 4,252,413 A  2/1981 Nablo
4,410,560 A  10/1983 Kosterka
(Continued)

FOREIGN PATENT DOCUMENTS

CN   101528550 A   9/2009
CN   103608262 A   2/2014
(Continued)

OTHER PUBLICATIONS

International Search Report and Written Opinion received in PCT Application No. PCT/EP2023/059617 as mailed Jul. 14, 2023 in 9 pages.
(Continued)

*Primary Examiner* — Sameh Tawfik
(74) *Attorney, Agent, or Firm* — Knobbe, Martens, Olson & Bear, LLP (57) ABSTRACT

A method for packaging a food product is provided. The method can comprise receiving at least one piece of packaging material (PM) in a packaging machine, said packaging material (PM) comprising a cellulose-based mid-layer, an inside layer arranged to face the food product (FP), and an outside layer, wherein an ink-based print is provided on the outside layer, curing the inside layer of the at least one piece of packaging material (PM) such that ink particles, released from the outside layer to the inside layer, are bound to the inside layer, thereby preventing the ink particles from being released into the food product (FP), forming the at least one piece of packaging material (PM) into packages, and filling the packages with the food product (FP).

13 Claims, 4 Drawing Sheets

(51) Int. Cl.
- *A61L 2/10* (2006.01)
- *B41J 11/00* (2006.01)
- *B41M 5/00* (2006.01)
- *B41M 7/00* (2006.01)
- *B65B 9/20* (2012.01)
- *B65B 55/08* (2006.01)
- *B65D 65/40* (2006.01)
- *B65D 81/30* (2006.01)

(52) U.S. Cl.
CPC ........ *B41M 5/0064* (2013.01); *B41M 7/0081* (2013.01); *B65B 9/20* (2013.01); *B65B 55/08* (2013.01); *B65D 65/40* (2013.01); *B65D 81/30* (2013.01); *A61L 2202/11* (2013.01); *A61L 2202/23* (2013.01)

(58) Field of Classification Search
CPC ............ A61L 2202/11; A61L 2202/23; B41M 5/0064; B41M 7/0081; B65D 65/40; B65D 81/30
USPC .......................................................... 53/426
See application file for complete search history.

(56) References Cited

U.S. PATENT DOCUMENTS

| | | | |
|---|---|---|---|
| 4,424,260 A | 1/1984 | Pupp | |
| 4,495,016 A | 1/1985 | Viberg et al. | |
| 4,535,230 A | 8/1985 | Brieu | |
| 4,610,649 A * | 9/1986 | Friess | B41F 19/00 493/63 |
| 4,624,184 A | 11/1986 | Katz et al. | |
| 4,831,153 A | 5/1989 | Phung | |
| 5,165,799 A | 11/1992 | Wood | |
| 5,481,975 A | 1/1996 | Schulz | |
| 5,729,814 A | 3/1998 | Suzuki et al. | |
| 5,767,975 A | 6/1998 | Ahlen | |
| 5,817,260 A | 10/1998 | Lynn et al. | |
| 5,826,509 A | 10/1998 | Deneka | |
| 6,041,574 A | 3/2000 | Bennett | |
| 6,074,056 A | 6/2000 | Kubo et al. | |
| 6,102,536 A | 8/2000 | Jennel | |
| 6,135,654 A | 10/2000 | Jennel | |
| 6,247,809 B1 | 6/2001 | Kashiwagi et al. | |
| 6,269,995 B1 | 8/2001 | Rich et al. | |
| 6,401,613 B1 | 6/2002 | Gayle et al. | |
| 6,416,798 B1 | 7/2002 | Gentine et al. | |
| 6,447,112 B1 | 9/2002 | Hu et al. | |
| 6,548,572 B1 | 4/2003 | Breck et al. | |
| 6,550,905 B1 * | 4/2003 | Deckers | C09D 11/101 347/100 |
| 6,585,924 B1 | 7/2003 | Harget et al. | |
| 6,666,002 B1 | 12/2003 | Otsuka et al. | |
| 6,685,883 B2 | 2/2004 | Schianchi et al. | |
| 6,810,813 B2 * | 11/2004 | Chretinat | B41F 33/0036 101/485 |
| 7,348,578 B2 | 3/2008 | Näslund et al. | |
| 7,692,812 B2 | 4/2010 | Schoedinger et al. | |
| 7,839,140 B2 | 11/2010 | Holmström | |
| 8,177,231 B2 | 5/2012 | Fukui et al. | |
| 8,177,316 B2 | 5/2012 | Muto | |
| 8,408,827 B2 | 4/2013 | Takeuchi et al. | |
| 8,582,171 B2 | 11/2013 | Srnka et al. | |
| 8,764,154 B2 | 7/2014 | Sugimura et al. | |
| 9,371,146 B2 | 6/2016 | Tsuruta et al. | |
| 9,409,430 B2 | 8/2016 | Arimura | |
| 10,155,390 B2 | 12/2018 | Kearns et al. | |
| 10,280,388 B2 | 5/2019 | Pellaud et al. | |
| 10,442,940 B2 | 10/2019 | Loccufier et al. | |
| 10,632,737 B2 | 4/2020 | Billing et al. | |
| 11,370,629 B2 | 6/2022 | Shourvarzi et al. | |
| 2002/0153818 A1 | 10/2002 | Schult et al. | |
| 2003/0001108 A1 | 1/2003 | Rangwalla et al. | |
| 2003/0133162 A1 | 7/2003 | Lupien, Jr. et al. | |
| 2004/0001917 A1 | 1/2004 | Urlaub et al. | |
| 2004/0014577 A1 | 1/2004 | Hiramoto | |
| 2004/0086421 A1 | 5/2004 | Moller et al. | |
| 2004/0089820 A1 | 5/2004 | Rangwalla et al. | |
| 2005/0129434 A1 | 6/2005 | Kim | |
| 2005/0140491 A1 | 6/2005 | Uehara et al. | |
| 2005/0200680 A1 | 9/2005 | Uchida | |
| 2005/0238262 A1 | 10/2005 | Jenkins | |
| 2005/0248608 A1 | 11/2005 | DeVivo et al. | |
| 2006/0032928 A1 | 2/2006 | Schaedel | |
| 2006/0038865 A1 | 2/2006 | Nagasaki et al. | |
| 2006/0081141 A1 | 4/2006 | Deneka | |
| 2006/0187266 A1 | 8/2006 | Rivos et al. | |
| 2007/0058019 A1 | 3/2007 | Saitoh et al. | |
| 2007/0289464 A1 | 12/2007 | Wintersgill et al. | |
| 2008/0218570 A1 | 9/2008 | Kovacs et al. | |
| 2008/0240753 A1 | 10/2008 | Kobayashi | |
| 2008/0245034 A1 | 10/2008 | Topfer | |
| 2008/0316507 A1 | 12/2008 | Ying | |
| 2009/0015617 A1 | 1/2009 | Odaka et al. | |
| 2009/0016785 A1 | 1/2009 | Haan et al. | |
| 2009/0038264 A1 | 2/2009 | Redaelli | |
| 2009/0208369 A1 | 8/2009 | Olsson et al. | |
| 2009/0225110 A1 | 9/2009 | Soler et al. | |
| 2009/0260739 A1 * | 10/2009 | Fischer | B65B 41/16 156/290 |
| 2010/0016137 A1 | 1/2010 | Benedetti et al. | |
| 2010/0080913 A1 | 4/2010 | Irita | |
| 2010/0083615 A1 | 4/2010 | Till | |
| 2011/0006225 A1 | 1/2011 | Fletcher et al. | |
| 2011/0062347 A1 | 3/2011 | Eguchi et al. | |
| 2011/0252992 A1 | 10/2011 | Viturro et al. | |
| 2011/0256996 A1 | 10/2011 | Palm et al. | |
| 2012/0076995 A1 | 3/2012 | Nilsson et al. | |
| 2012/0223996 A1 | 9/2012 | Ernst et al. | |
| 2013/0235394 A1 | 9/2013 | Jordan et al. | |
| 2013/0269551 A1 | 10/2013 | Till | |
| 2013/0321539 A1 | 12/2013 | Hiraoka | |
| 2014/0035986 A1 | 2/2014 | Adachi | |
| 2014/0060426 A1 | 3/2014 | Riga | |
| 2014/0104360 A1 | 4/2014 | Häcker et al. | |
| 2014/0134044 A1 | 5/2014 | Laguzzi | |
| 2014/0199090 A1 | 7/2014 | Kikushima | |
| 2014/0274629 A1 | 9/2014 | Lykowski et al. | |
| 2014/0362134 A1 | 12/2014 | De Grius et al. | |
| 2015/0191011 A1 | 7/2015 | MacKenzie et al. | |
| 2015/0290926 A1 | 10/2015 | Branca et al. | |
| 2015/0291300 A1 | 10/2015 | Brandt Sanz et al. | |
| 2016/0259277 A1 | 9/2016 | Umeno | |
| 2017/0057766 A1 | 3/2017 | Kodama et al. | |
| 2018/0015763 A1 | 1/2018 | Zhou et al. | |
| 2018/0022119 A1 | 1/2018 | Kamigiku et al. | |
| 2018/0022947 A1 | 1/2018 | Lapin | |
| 2018/0215492 A1 | 8/2018 | Barros et al. | |
| 2018/0251328 A1 | 9/2018 | Karikusa et al. | |
| 2018/0259886 A1 | 9/2018 | Ajima | |
| 2019/0001661 A1 | 1/2019 | Billing et al. | |
| 2019/0039372 A1 * | 2/2019 | Kinoshita | C09D 11/322 |
| 2019/0136435 A1 | 5/2019 | Schaumann | |
| 2019/0337215 A1 | 11/2019 | Rosamond, III et al. | |
| 2021/0229466 A1 | 7/2021 | Cederstrom et al. | |
| 2021/0276355 A1 | 9/2021 | Donner et al. | |
| 2021/0323319 A1 * | 10/2021 | Olsson | B41J 11/008 |
| 2022/0017245 A1 | 1/2022 | Olsson et al. | |
| 2022/0041394 A1 * | 2/2022 | Shourvarzi | B65B 41/18 |
| 2025/0033820 A1 * | 1/2025 | Talda | B65B 61/025 |

FOREIGN PATENT DOCUMENTS

| | | |
|---|---|---|
| CN | 209521944 U | 10/2019 |
| CN | 111942032 A | 11/2020 |
| DE | 3220537 A1 | 12/1983 |
| DE | 19516223 A1 | 11/1996 |
| DE | 10 2006 019994 A1 | 10/2007 |
| DE | 102007018132 A1 | 10/2008 |
| EP | 1 266 830 A1 | 12/2002 |
| EP | 1914168 A1 | 4/2008 |
| EP | 2251200 A2 | 11/2010 |
| EP | 3310668 A1 | 4/2018 |

(56) References Cited

FOREIGN PATENT DOCUMENTS

| | | |
|---|---|---|
| EP | 3549878 A1 | 10/2019 |
| GB | 2 086 309 A | 5/1982 |
| GB | 2157140 B | 4/1987 |
| GB | 2336809 A | 3/1999 |
| JP | S6399968 | 5/1988 |
| JP | WO2008/004667 A1 | 1/2008 |
| JP | 2016117246 A | 6/2016 |
| WO | WO 97/27053 A1 | 4/1997 |
| WO | WO 03/037722 A1 | 5/2003 |
| WO | WO 2004/045953 A1 | 6/2004 |
| WO | WO 2005/105450 A1 | 11/2005 |
| WO | WO 2010/071543 A1 | 6/2010 |
| WO | WO 2010/138052 A1 | 12/2010 |
| WO | WO 2011/021052 A2 | 2/2011 |
| WO | WO 2013/064415 A1 | 5/2013 |
| WO | WO 2013/131746 A1 | 9/2013 |
| WO | WO 2014/041481 A1 | 3/2014 |
| WO | WO 2014/108953 A1 | 7/2014 |
| WO | WO 2015/022228 A1 | 2/2015 |
| WO | WO 2016/207125 A2 | 12/2016 |

OTHER PUBLICATIONS

Bailes, "The Secret to Moving Air Efficiently through Your Duct System," https://www.energyvanguard.com/blog/secret-moving-air-quietly-through-your-duct-system, Aug. 20, 2015 in 6 pages.
Phosgenations—A Handbook by L. Cotarca and H. Eckert, John Wiley & Sons (2003), Section 4.3.2.8, pp. 212 213.
Office Action received in Chinese Patent Application No. 202380035410.7 dated Apr. 1, 2025 in 9 pages.

\* cited by examiner

METHOD FOR PACKAGING A FOOD PRODUCT AND A PACKAGING MACHINE

TECHNICAL FIELD

The invention generally relates to liquid food packaging technology. More particularly, it is related to a method for reducing a risk of having ink particles, related to a print of a packaging material, transferred into a food product.

BACKGROUND ART

Roll-fed packaging machines are today commonly available. One example of such packaging machines, sometimes also referred to as filling machines, is Tetra Pak™ A3 marketed by Tetra Pak™. In brief, in the roll-fed packaging machines, a reel of rolled-up packaging material is received. The packaging material is unrolled and a web of packaging material is fed into the machine. To provide for that no or at least very few unwanted microorganisms are spread from the packaging material to a food product, the web is treated by using a hydrogen peroxide bath or a low-voltage electron beam (LVEB) device. Once microorganisms on the web has been killed off, the web can be formed into a tube held vertically. By filling the food product into the tube from above, and continuously sealing and cutting in a lower end of the tube, packages can be produced at impressive speed, e.g. 30 000 packages per hour.

Before the packaging material is provided to the packaging machine, the packaging material is printed. Most often, the packaging material is produced and printed in a so-called converting factory. In brief, in such factory, a laminate comprising different layers is produced, and a print, sometimes referred to as a décor, is provided on an outside layer of the packaging material.

When rolling up the packaging material on the reel, the outside layer, provided with the print, is held against an inside layer. As an effect of this, there is a risk that ink particles are transferred from the outside layer onto the inside layer, which is made to face the food product once the packages are formed. To reduce the impact of having the ink particles on the inside layer, food graded inks have been developed that are safe for the consumers, that is, even if ending up in the food product the consumers will not be at risk. Alternatively or in addition, a cover layer is provided on top of the print such that the risk is removed or at least mitigated.

Another possible solution to the problem is to have the print provided in the packaging machine after the packaging material is rolled off the reel, i.e. by changing the order of the steps, and by not having the print provided when the packaging material is provided on the reel, the risk of having the print particles transferred from the outside layer to the inside layer can thus be removed.

Even though there are solutions available with respect to how to avoid, or at least reduce, negative effects related to ink particles transferred from the outside layer to the inside layer during transport of the packaging material, the problem of migrated ink particles still remains. Thus, there is a need for solutions reducing the negative effects of ink particles transferred between the outside layer and the inside layer without compromising on cost efficiency and versatility of the packaging machine.

SUMMARY

It is an object of the invention to at least partly overcome one or more of the above-identified limitations of the prior art. In particular, it is an object to present a safe, cost efficient and versatile way to reduce the impact of ink particles transferred from an outside layer of the packaging material, provided with a print, to an inside layer of the packaging material, arranged to face the food product once the packages are formed.

According to a first aspect it is provided a method for packaging a food product, said method comprising
  receiving at least one piece of packaging material in a packaging machine, said packaging material comprising a cellulose-based mid-layer, an inside layer arranged to face the food product, and an outside layer, wherein an ink-based print is provided on the outside layer,
  curing the inside layer of the at least one piece of packaging material such that ink particles, released from the outside layer to the inside layer, are bound to the inside layer, thereby preventing the ink particles from being released into the food product,
  forming the at least one piece of packaging material into packages, and
  filling the packages with the food product.

An advantage with curing the packaging material after this has been received in the packaging machine is that even if ink particles have been transferred from the outside layer to the inside layer e.g. during transport from a printer arrangement to the packaging machine, these particles are bound to the inside layer such that these are not transferred from the inside layer to the food product at a later stage. By having the curing device placed in this way, different measures for avoiding that the ink particles end up at the inside layer can be thus be left out, in turn providing for improved cost efficiency.

The curing can be made by an ultraviolet (UV) lamp, an electron beam device and/or a light emitting diode (LED) device.

The method may further comprise, at the same time as curing the inside layer,
  reducing number of microorganisms on the inside layer by using the UV lamp, the electron beam device and/or the LED device.

The energy, often in the form of light, used for curing the ink particles on the inside layer, can also be used for killing off microorganisms provided on the inside layer. Thus, the energy emitted onto the inside layer may serve dual purposes; curing the ink particles such that these are not ending up in the food product, and killing off microorganisms such that these are not transferred into the food product.

The packaging material may be provided with a light barrier layer arranged to allow light in transmission wavelengths to pass, and the method may further comprise
  emitting the light from the UV lamp, the electron beam device and/or the LED device in the transmission wavelengths, and
  reducing number of microorganisms on the outside layer of the web by the light in the transmission wavelengths passed through the packaging material.

An advantage of having a light barrier layer allowing the light in transmission wavelengths to pass through is that it is made possible to both shield off the food product from sunlight, thereby reducing the risk that the food product deteriorates, but still allow the light, being in a limited wavelength area, to pass through the packaging material and thereby allowing the energy emitted from the UV lamp, LED lamp and/or the electron beam device to not only reducing the number of microorganisms on the inside layer, but also on the outside layer.

The light emitted by the LED device has ink-specific wavelengths adapted to meet properties of the ink (Ink) being used.

The packaging material may be void of a cover layer placed outside the outside layer provided with the print.

Since the transferred ink particles on the inside layer is bound by the curing device, the risk of having the ink particles transferred from the outside layer to the inside layer is mitigated. As an effect, there is no reason, or at least less reason, to provide measures for hindering transfer of the ink particles from the outside layer to the inside layer. By being able to leave out the cover layer, it is made possible to provide a more cost efficient packaging material, but also that the printer arrangement does not have to be equipped for providing the cover layer after the printing.

The packaging material may be void of an ink migration preventing layer, thereby allowing ink particles to migrate from the outside layer to the inside layer through the packaging material.

Transfer of the ink particles from the outside layer to the inside layer is not necessarily the result of that the web of packaging material is rolled up on a reel such that the inside layer abuts the outside layer, but may also be the result of that the ink particles have passed through the packaging material. To avoid such transfer it has been common practice to use the ink migration preventing layer. However, by being able to handle the ink particles on the inside layer in the packaging machine, there is no need, or at least a reduced need, for such ink migration preventing layer. Thus, this layer can be left out, in turn resulting in a more cost efficient packaging material.

The step of curing can be divided in first stage curing in which a first range of wavelengths are used, and second stage curing in which a second range of wavelengths are used, wherein the second range of wavelengths is broader than the first range of wavelengths.

The first stage curing may be made by the LED device, and the second stage curing may be made by the UV lamp.

Using a combination of the LED device followed by the UV lamp may come with the benefit that light with a specific wavelength range, tuned to meet the properties of the ink being used, can be applied in a first step and a broad wavelength range can be applied in a second step to secure that the ink particles not properly bound by the LED device are bound securely after passing the UV lamp.

The packaging machine may be a roll-fed packaging machine, and the packaging material may be provided to the packaging machine in the form of a web rolled up on a reel such that the outside layer abuts the inside layer.

Having the possibility to store printed packaging material on reels after printing has been provided by the printer arrangement and before the packages are formed and filled in the packaging machine provides for efficient storage of packaging material and improved supply chain.

According to a second aspect it is provided a packaging machine for packaging a food product, said machine comprising
- a packaging material receiver arranged to receive packaging material, said packaging material comprising a cellulose-based mid-layer, an inside layer arranged to face the food product, and an outside layer, wherein print is provided on the outside layer with an ink,
- a curing device arranged to cure the inside layer such that ink particles placed on the inside layer are bound to the inside layer, thereby preventing for that the ink particles are released into the food product,
- a package former arranged to form the packaging material into packages, and
- a product filling device arranged to fill the food product into the packages.

The same features and advantages presented above with respect to the first aspect also apply to this second aspect.

The curing device may comprise an ultraviolet (UV) lamp, an electron beam device and/or a light emitting diode (LED) device.

The curing device may be a curing and microorganisms reducing device arranged to cure and reducing a number of microorganisms on the inside layer at the same time.

The packaging material may be provided with a light barrier layer arranged to allow light in transmission wavelengths to pass, wherein the UV lamp, the electron beam device and/or the LED device may be arranged to emit light in the transmission wavelengths, thereby allowing microorganisms reduction of the outside layer of the web by the light in the transmission wavelengths passed through the packaging material.

The packaging material receiver may be a packaging material reel receiver arranged to receive the packaging material in the form of a reel with a web of packaging material rolled up, wherein the packaging machine may further comprise a web feeder arranged to unroll the web from the reel and feed the web downstream in the packaging machine.

Still other objectives, features, aspects and advantages of the invention will appear from the following detailed description as well as from the drawings.

BRIEF DESCRIPTION OF THE DRAWINGS

Embodiments of the invention will now be described, by way of example, with reference to the accompanying schematic drawings, in which.

DETAILED DESCRIPTION

Figure 1:
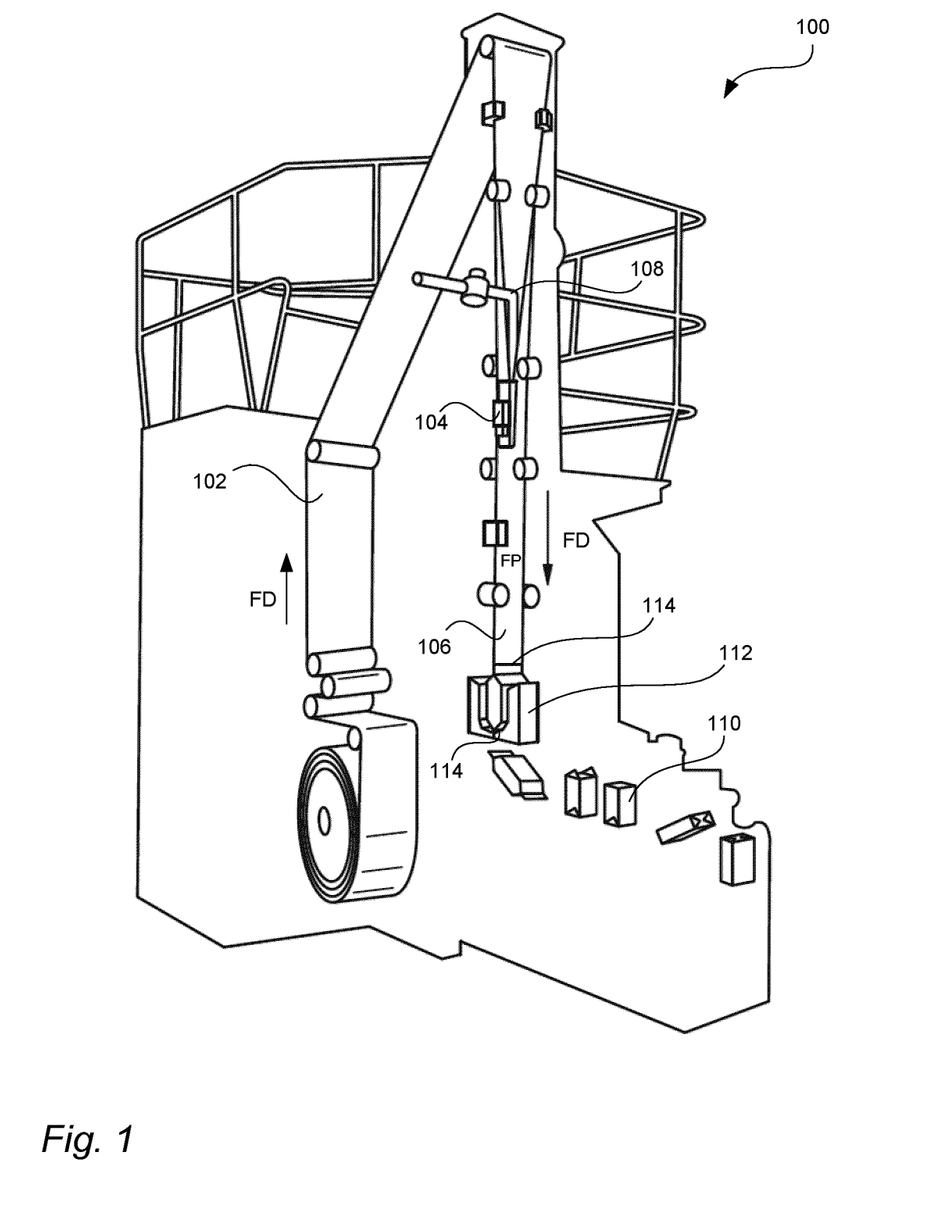
FIG. 1 is a perspective view of a roll-fed packaging machine.

FIG. 1 generally illustrates a packaging machine 100. In the illustrated example, the packaging machine 100 is a roll-fed carton packaging machine. The general principle of such a machine is that from a roll of packaging material PM, a web 102 is formed. Although not illustrated, if needed in order to fulfil food safety regulations, the web 102 may be sterilized using a hydrogen peroxide bath, a Low Voltage Electron Beam (LVEB) device or any other apparatus capable of reducing a number of unwanted microorganisms. After sterilization, by using a longitudinal sealing arrangement 104, the web 102 can be formed into a tube 106. When having formed the tube, a food product FP, for instance milk, can be fed into the tube 106 via a product pipe 108 placed at least partly inside the tube 106.

In order to form a package 110 from the tube 106 filled with food product FP, a transversal sealing can be made in a lower end of the tube by using a transversal sealing arrangement 112. Generally, this arrangement 112 has two main functions; 1) providing the transversal sealing, i.e. welding two opposite sides of the tube together such that the product in a lower part of the tube, placed downward the sealing arrangement, is separated from the product in the tube placed upward the sealing arrangement, and 2) cutting off the lower part of the tube in transversal sealing sections 114 such that the packages 110 are formed. Alternatively, instead of providing the transversal sealing and cutting off the lower part in one and the same arrangement 112 as illustrated, the step of cutting off the lower part may be made in a subsequent step by a different piece of equipment, or by the consumer if the packages are intended to be sold in a multi-pack.

Figure 2:
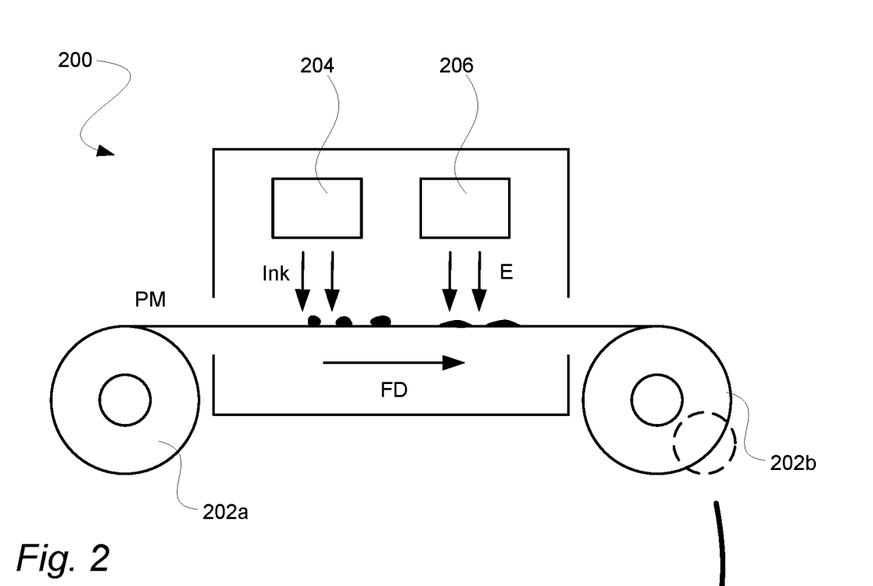
FIG. 2 generally illustrates a printer arrangement.

FIG. 2 generally illustrates a printer arrangement 200. Such arrangement can be provided at a food production site, e.g. a dairy, such that packaging material PM without print, or with some printed sections, can be provided to the site. An advantage with such set-up is that what product to be produced can be decided at a later stage. Another advantage is that less storage of packaging material PM is required, in particular for a site producing a large variety of products. Put differently, improved supply chain can be achieved.

In the example illustrated, a reel 202a holding packaging material PM without print is provided to the printer arrangement 200. After being unrolled, the packaging material PM is fed, in a feeding direction FD, to a printing device 204. This device 204 provides ink Ink onto the packaging material PM. Downstream the printing device 204, a curing device 206 is placed. To provide for that the ink Ink hardens and attaches properly to the packaging material PM, energy E, most often in the form of light, is emitted onto the packaging material PM. After having printed and cured, the packaging material PM is rolled up onto a reel with printed PM 202b.

Even though not illustrated, it may also be that the printing is made on the web 102 directly, that is, the web 102 is fed directly from production to the printer arrangement 200 and is thus not first rolled up on the reel 202a.

Figure 3:
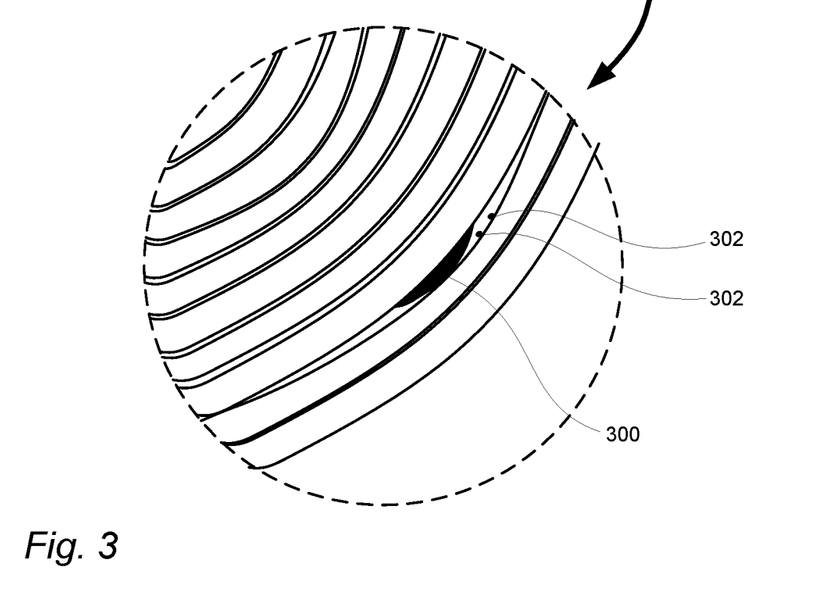
FIG. 3 illustrates a web of packaging material rolled up on a reel in detail.

As illustrated in FIG. 3, by applying energy E onto the ink Ink by the curing device 206, there will be formed cured ink particles 300 attached to the outside layer, but also transferred ink particles 302 placed on the inside layer. The transfer of ink particles may be an effect of that the web is rolled up, as illustrated, but the transfer may also occur in other ways. For instance, in some situations, even though not illustrated, due to air flows within the printer arrangement 200 ink particles may find their way to the inside layer of the packaging material. This may occur when having the web as illustrated in FIG. 2, but it may also occur when printing on e.g. a Polyethylene terephthalate (PET) bottle.

Figure 4A:
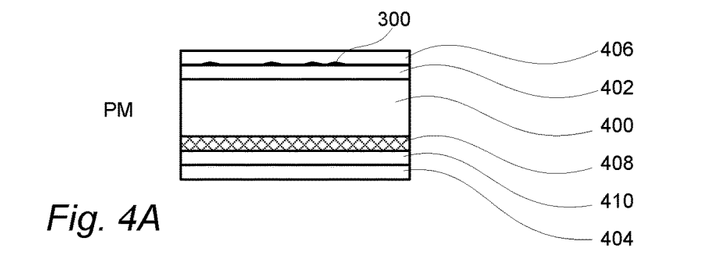
FIG. 4A-C illustrates three cross-sectional views of different packaging materials.

FIG. 4A generally illustrates a cross-sectional view of a packaging material PM that comprises a cellulose-based mid-layer 400, the outside layer 402 onto which the ink Ink is provided, the inside layer 404, arranged to face the food product FP, a cover layer 406 placed outside the outside layer 402, a light barrier layer 408, and an ink migration preventing layer 410. As illustrated, the light barrier layer 408 and the ink migration preventing layer 410 may be placed between the inside layer 404 and the cellulose-based mid-layer 400, but other configurations are also possible.

By having the cover layer 406 placed on top of the outside layer 402, the risk of having ink migration can be lowered. However, having such layer adds costs both in terms of a more complex packaging material, but also in that the printer arrangement 200 should be equipped with the functionality of adding this extra layer after printing. Thus, to achieve cost-efficiency as well as versatility, i.e. making on site printing attractive to a broader group of food producers, being able to leave out the cover layer 406 is beneficial.

The ink migration preventing layer 410 may be a layer of its own, as illustrated, but the functionality may also be achieved by a combination of different layers not only present for the sake of hindering ink migration. Even though the ink migration preventing layer 410 is not added in the printer arrangement 210 it adds cost to the packaging material, and if possible to leave out such layer, improved cost efficiency can be achieved.

Figure 4B:
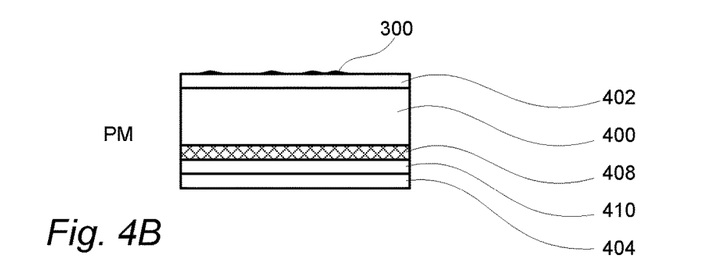

FIG. 4B generally illustrates a packaging material PM without the cover layer 406, but otherwise in line with the packaging material PM illustrated in FIG. 4A. One way of overcoming the increased risk of ink migration caused by not having the cover layer 406 is to not roll up the web on the reel, but since this requires the printer arrangement to be placed close to the packaging machine, this comes with drawbacks in terms of versatility.

Figure 4C:
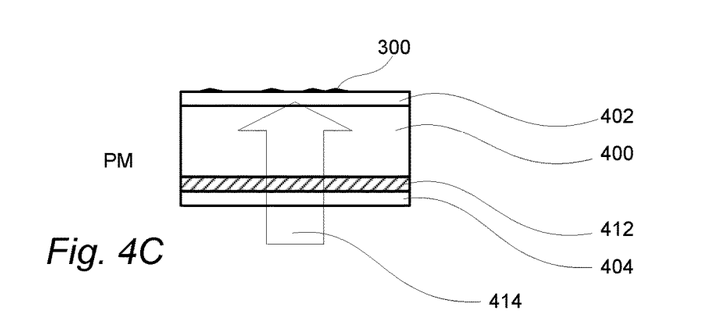

FIG. 4C generally illustrates a packaging material PM without the cover layer 406 and also without the ink migration preventing layer 410. By excluding the ink migration preventing layer 410, it may be possible for part of the ink Ink to migrate through the packaging material PM. Thus, when using the packaging material PM as illustrated in FIG. 4C, there is a risk that ink Ink migrates from the outside layer 402 to the inside layer 404 when being rolled-up, but also in that the ink Ink passes through the packaging material PM. A benefit of leaving out the ink migration preventing layer 410 is that a more cost efficient packaging material PM can be achieved.

In the packaging material PM illustrated in FIG. 4C, the light barrier layer 408 has been replaced by a light barrier layer 412 arranged to allow light 414 in transmission wavelengths to pass. In other words, instead of shielding off all light, the light barrier layer 412 is configured to allow light 414 in certain transmission wavelengths to pass. An advantage with this set-up is that the food product may be sufficiently shielded off from sunlight, thereby keeping a risk for microorganisms to grow in the food product FP low, but allow the light 414 passing through the packaging material PM to be used for killing off microorganisms on the outside layer 402 during treatment of the packaging material PM before this is filled with the food product FP.

Figure 5:
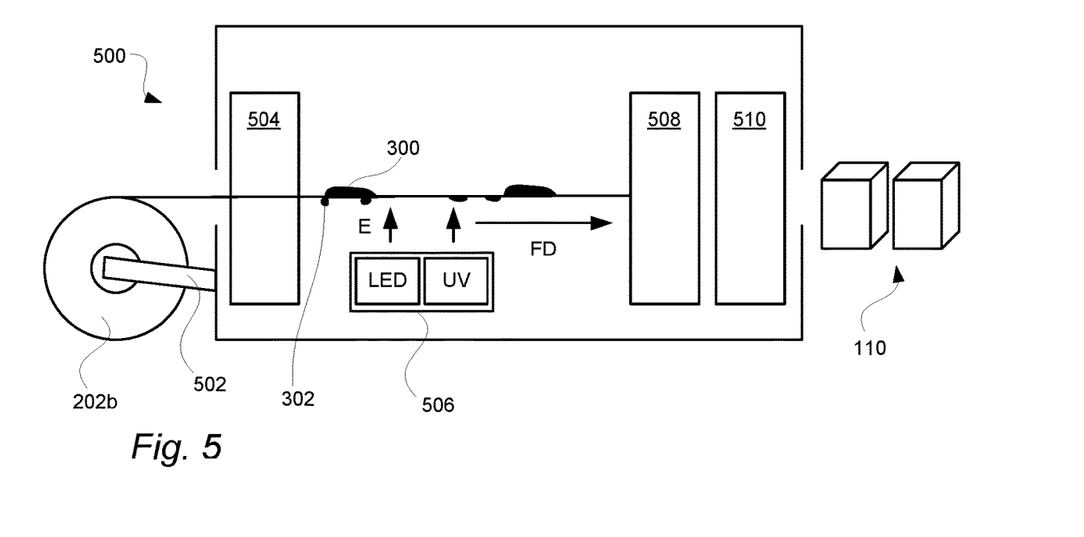
FIG. 5 generally illustrates a packaging machine with a built-in curing device.

To be able to use the packaging materials PM illustrated in FIG. 4B and 4C, a packaging machine 500 as illustrated in FIG. 5 can be used. The machine 500 may comprise a packaging material receiver 502, herein illustrated in the form of a reel receiver. After having placed the reel 202b with the printed PM, which may be printed by the printer arrangement 200 illustrated in FIG. 2, the packaging material can be unrolled and the web 102 fed in the feeding direction FD by a web feeder 504. Most often the web feeder 504 comprises a number of pieces arranged for feeding and directing the web 102.

In the filling machine 500, a curing device 506 can be provided for emitting energy E such that the transferred ink particles 302 placed on the inside layer 404 of the packaging material PM is cured, i.e. attached to the packaging material PM. The curing device 506 may comprise a light emitting diode (LED) device, an ultraviolet (UV) lamp and/or an electron beam device. As illustrated in FIG. 5, the curing device 506 may comprise a combination of the LED device and the UV lamp. By having this combination, the web 102 may first be exposed to the energy E emitted from the LED device and thereafter, downstream in the feeding direction FD, be exposed to the energy E emitted from the UV lamp.

By having such set-up it is made possible to first provide a first range of wavelengths and then a second range of wavelengths, wherein the second range is broader than the first range. The first range may be tuned to meet the properties of the ink Ink being used, thereby providing reliable and efficient curing.

By curing the inside layer 404 of the packaging material PM in the filling machine 500, the transferred ink particles 302, which may be at risk ending up in the food product FP, are cured and attached to the packaging material PM. Put differently, instead of avoiding that there are transferred particles 302, as has been the approach up until now, these are taken care of by the curing device 506. As described above with respect to the different packaging materials in FIG. 4A to 4C, this does not only provide advantages in terms of how the packaging material PM can be handled between the printer arrangement 200 and the packaging machine 500, but also in that more cost efficient packaging material PM can be used, e.g. packaging materials without the cover layer 406 and/or packaging material without the ink migration preventing layer 410.

After the web 102 has been cured, the packages are formed in a package former 508, further illustrated in FIG. 1, and the packages 110 are filled with the food product FP in a product filling device 510, also this further illustrated in FIG. 1. Even though illustrated as a roll-fed carton packaging machine, the same principles can be applied to other food packages in which there is a risk of ink particles ending up in the food product.

Even though it is illustrated that the curing device 506 is integrated with other parts of the packaging machine 500, other implementations are also available. For instance, the packaging material receiver 502, part of the web feeder 504 and the curing device 506 may be provided in a separate piece of equipment connected to the packaging machine 500. Such embodiment may prove useful in case existing packaging machines without curing devices are to be upgraded.

Figure 6:
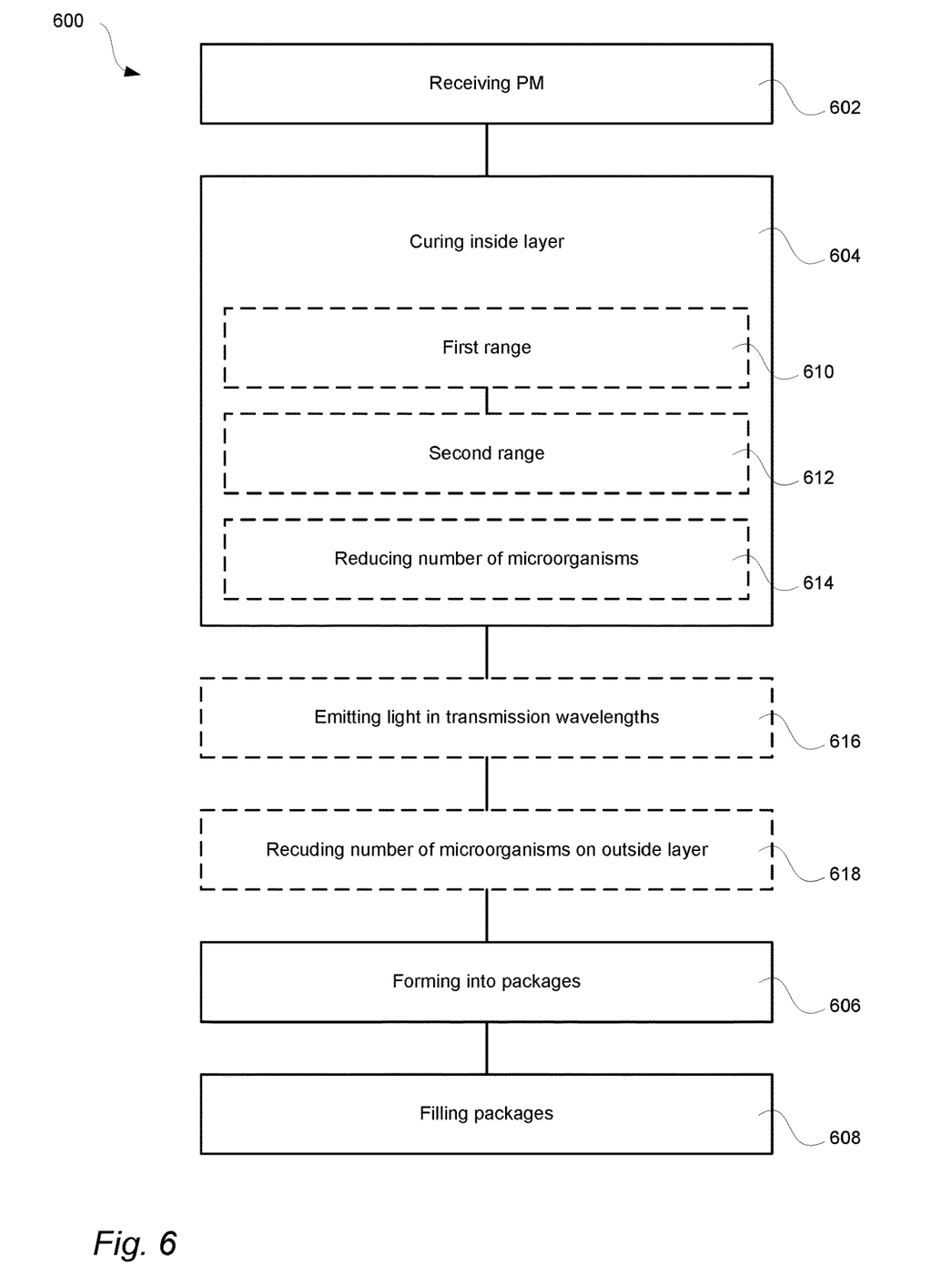
FIG. 6 is a flowchart illustrating a method for packaging a food product.

FIG. 6 is a flowchart illustrating a method 600 for packaging the food product FP. In a first step 602, at least one piece of the packaging material PM can be received in the packaging machine 500. The packaging material PM can comprise the cellulose-based mid-layer 400, the inside layer 404 arranged to face the food product FP, and the outside layer 402, wherein an ink-based print is provided on the outside layer 402.

In a second step 604, the inside layer 404 of the at least one piece of packaging material PM can be cured such that the ink particles 302, released from the outside layer 402 to the inside layer 404, are bound to the inside layer 404, thereby preventing the ink particles 302 from being released into the food product FP.

In a third step 606, the at least one piece of packaging material PM can be formed into the packages 110.

In a fourth step 608, the packages 110 can be filled with the food product FP.

Optionally, the second step 604 can be divided in a first stage curing 610 in which the first range of wavelengths can be used, and a second stage curing 612 in which the second range of wavelengths are used, wherein the second range of wavelengths can be broader than the first range of wavelengths.

Optionally, in a fifth step 614, which may be performed in parallel with the second step 604, the number of microorganisms on the inside layer 404 can be reduced by using the UV lamp, the electron beam device and/or the LED device. In other words, at the same time, the transferred ink particles can be bound to the inside layer 404, thereby reducing the risk of having these ending up in the food product, and the number of microorganisms on the inside layer 404 can be reduced.

Optionally, in a sixth step 616, the light in the transmission wavelengths 414 can be emitted from the UV lamp, the electron beam device and/or the LED device, and in a seventh step 618, a number of microorganisms on the outside layer 402 of the web 102 can be reduced by the light 414 in the transmission wavelengths passed through the packaging material PM.

From the description above follows that, although various embodiments of the invention have been described and shown, the invention is not restricted thereto, but may also be embodied in other ways within the scope of the subject-matter defined in the following claims.

The invention claimed is:

1. A method for packaging a food product, said method comprising:
   receiving at least one piece of packaging material in a packaging machine, said packaging material comprising a cellulose-based mid-layer, an inside layer arranged to face the food product, and an outside layer, wherein an ink-based print is provided on the outside layer;
   curing the inside layer of the at least one piece of packaging material, wherein ink particles, released from the outside layer to the inside layer, are bound to the inside layer, thereby preventing the ink particles from being released into the food product;
   forming the at least one piece of packaging material into packages; and
   filling the packages with the food product.

2. The method according to claim 1, wherein the curing is made by an ultraviolet (UV) lamp, an electron beam device and/or a light emitting diode (LED) device.

3. The method according to claim 2, further comprising, at the same time as curing the inside layer, reducing number of microorganisms on the inside layer by using the UV lamp, the electron beam device and/or the LED device.

4. The method according to claim 3, wherein the packaging material is provided with a light barrier layer arranged to allow light in transmission wavelengths to pass, said method further comprising emitting the light from the UV lamp, the electron beam device and/or the LED device in the transmission wavelengths, reducing number of microorganisms on the outside layer of the web by the light in the transmission wavelengths passed through the packaging material.

5. The method according to claim 2, wherein the light emitted by the LED device has ink-specific wavelengths adapted to meet properties of the ink being used.

6. The method according to claim 1, wherein the packaging material is void of a cover layer placed outside the outside layer provided with the print.

7. The method according to claim 1, wherein the packaging material is void of an ink migration preventing layer, thereby allowing ink particles to migrate from the outside layer to the inside layer through the packaging material.

8. The method according to claim 1, wherein the step of curing is divided in first stage curing in which a first range of wavelengths are used, and second stage curing in which a second range of wavelengths are used, wherein the second range of wavelengths is broader than the first range of wavelengths.

9. The method according to claim 8, wherein the first stage curing is made by the LED device, and the second stage curing is made by the UV lamp.

10. The method according to claim 1, wherein the packaging machine is a roll-fed packaging machine, and the packaging material is provided to the packaging machine in the form of a web rolled up on a reel such that the outside layer abuts the inside layer.

11. The packaging machine according to claim 10, wherein the curing device comprises an ultraviolet lamp, an electron beam device and/or a light emitting diode device.

12. The packaging machine according to claim 10, wherein the curing device is a curing and microorganisms reducing device arranged to cure and reducing a number of microorganisms on the inside layer at the same time.

13. The packaging machine according to claim 10, wherein the packaging material is provided with a light barrier layer arranged to allow light in transmission wavelengths to pass, wherein the UV lamp, the electron beam device and/or the LED device are arranged to emit light in the transmission wavelengths, thereby allowing microorganisms reduction of the outside layer of the web by the light in the transmission wavelengths passed through the packaging material.

* * * * *